US009208821B2

(12) United States Patent
Evans et al.

(10) Patent No.: US 9,208,821 B2
(45) Date of Patent: Dec. 8, 2015

(54) METHOD AND SYSTEM TO PROCESS DIGITAL AUDIO DATA

(75) Inventors: Matt Evans, San Francisco, CA (US); Ole Lagemann, Hamburg (DE); John Danty, SW Calgary (CA); Jan-Hinnerk Helms, Hamburg (DE); Gerhard Lengeling, Los Altos, CA (US); Alexander Soren, San Francisco, CA (US); Timothy Benjamin Martin, Sunnyvale, CA (US); Stefan Pillhofer, Hamburg (DE)

(73) Assignee: Apple Inc., Cupertino, CA (US)

( * ) Notice: Subject to any disclaimer, the term of this patent is extended or adjusted under 35 U.S.C. 154(b) by 1728 days.

(21) Appl. No.: 11/834,668

(22) Filed: Aug. 6, 2007

(65) Prior Publication Data
US 2009/0044122 A1 Feb. 12, 2009

(51) Int. Cl.
G06F 3/00 (2006.01)
G11B 27/034 (2006.01)
G10H 1/00 (2006.01)
G11B 27/32 (2006.01)
G11B 27/34 (2006.01)

(52) U.S. Cl.
CPC ............ G11B 27/034 (2013.01); G10H 1/0025 (2013.01); G11B 27/322 (2013.01); G11B 27/34 (2013.01); G10H 2210/125 (2013.01); G10H 2220/005 (2013.01)

(58) Field of Classification Search
CPC .... G11B 27/34; G11B 27/034; G06F 3/0484; G10H 1/0025; G10H 2210/125; G10H 2220/005
USPC .................................................. 715/716, 727
See application file for complete search history.

(56) References Cited

U.S. PATENT DOCUMENTS

| | | | |
|---|---|---|---|
| 5,153,829 A | 10/1992 | Furuya et al. | |
| 5,212,733 A | 5/1993 | DeVito et al. | |
| 5,724,605 A * | 3/1998 | Wissner ......................... | 715/202 |
| 5,781,188 A | 7/1998 | Amiot et al. | |
| 6,137,945 A * | 10/2000 | McGrath ........................ | 386/282 |
| 6,222,549 B1 | 4/2001 | Hoddie | |
| 6,490,359 B1 | 12/2002 | Gibson | |
| 6,704,012 B1 * | 3/2004 | Lefave ........................... | 345/440 |
| 6,898,291 B2 | 5/2005 | Gibson | |
| 6,959,220 B1 * | 10/2005 | Wiser et al. ..................... | 700/94 |
| 7,328,412 B1 * | 2/2008 | Cannistraro et al. .......... | 715/833 |
| 7,343,210 B2 | 3/2008 | DeVito et al. | |
| 7,491,878 B2 * | 2/2009 | Orr ................................ | 84/609 |
| 7,650,575 B2 * | 1/2010 | Cummins et al. .............. | 715/769 |
| 7,742,609 B2 | 6/2010 | Yeakel et al. | |
| 7,774,707 B2 | 8/2010 | Sim | |

(Continued)

OTHER PUBLICATIONS

Victor Gavenda, GarageBand 2 for Mac OS X: Visual Quickstart Guide, Apr. 15, 2005 (32 Pages total).*

(Continued)

Primary Examiner — Steven Sax
Assistant Examiner — Christopher J Fibbi
(74) Attorney, Agent, or Firm — Fletcher Yoder PC

(57) ABSTRACT

A method to process digital audio data displays the digital audio data in one or more tracks along a time line in a graphical interface of a computer system and defines arrange regions within the time line of the digital audio data as objects for manipulation. Tracks within a selected arrange region are processed as an entity in accordance with commands received through the graphical user interface.

42 Claims, 17 Drawing Sheets

(56) References Cited

U.S. PATENT DOCUMENTS

| | | | |
|---|---|---|---|
| 7,790,974 B2* | 9/2010 | Sherwani et al. | 84/609 |
| 2002/0178006 A1* | 11/2002 | Suzuki et al. | 704/258 |
| 2007/0175317 A1 | 8/2007 | Salter | |
| 2008/0044155 A1* | 2/2008 | Kuspa | 386/52 |
| 2008/0215599 A1 | 9/2008 | Yun | |

OTHER PUBLICATIONS

Victor Gavenda, Garage Band 2 for Mac OS X: Visual Quickstart Guide, Apr. 15, 2005 (1 page).*

Victor Gavenda, GarageBand 2 for Mac OS X: Visual Quickstart Guide, Chapter 3—Stack Order, Apr. 15, 2005 (pp. 58-59).*

David Pogue, *GarageBand 2 The Missing Manual*, Aug. 2005, O'Reilly Media, Sebastopol, California, USA [cover, title page, and Table of Contents (6 pages total)].

Mary Plummer, *GarageBand 3 Create and Record Music on a Mac*, 2006, Peachpit Press, Berkeley, California, USA [cover, title page and Table of Contents (6 pages total)].

* cited by examiner

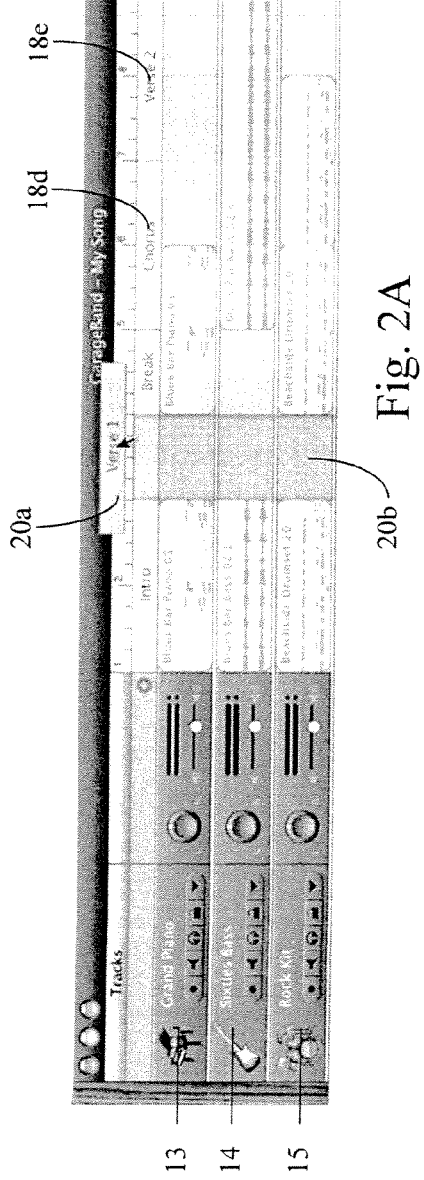
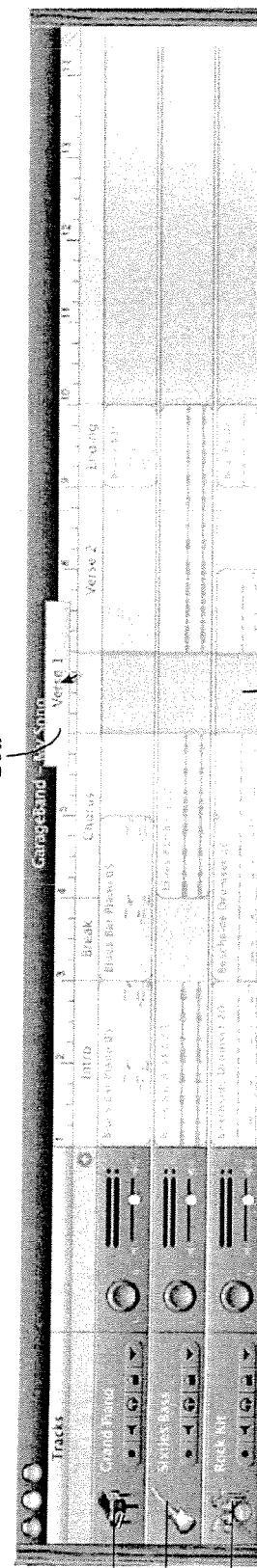
Fig. 2A
Fig. 2B

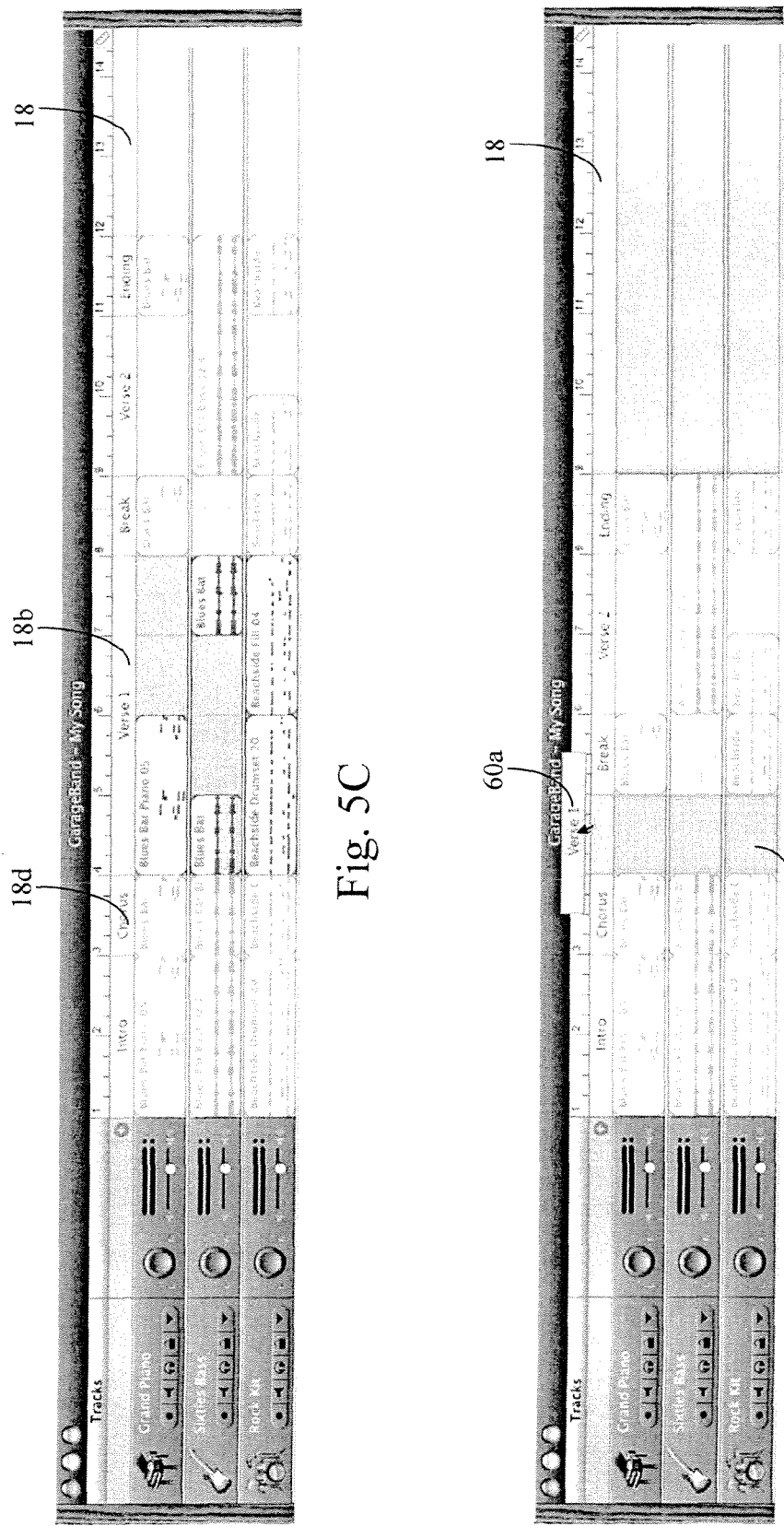

METHOD AND SYSTEM TO PROCESS DIGITAL AUDIO DATA

RELATED APPLICATIONS

This application is related to co-pending U.S. application Ser. No. 11/834,673 filed on the same day, which is incorporated herein by reference.

The present invention relates to processing digital audio data.

BACKGROUND OF THE INVENTION

Computers and/or other data processing systems are increasingly used to compose, process or modify music in the form of digital audio data. Digital audio processing software is e.g. available from APPLE Inc. under the product names GarageBand (for home use) and LogicPro (for professional use). Such Digital Audio Workstations (DAW) or systems allow the user to build a piece of music, by arranging and editing self-recorded and pre-fabricated music building blocks on so called tracks, each track representing a certain instrument or sound. The tracks can be visualized on a graphical user interface of the DAW.

A known system available from the Steinberg company under the product name Cubase 4 further allows a user to manipulate selectable parts of a song (including all its tracks) by displaying lists of such parts wherein these parts can be re-arranged for playback in a different order.

However, handling of such lists is cumbersome for the users and the result of the manipulation can only be assessed after playing back the modified digital audio data. There is no immediate feedback to the user while he is manipulating the parts of the piece of music.

SUMMARY OF THE DESCRIPTION

The present invention provides an improved method and a system for processing digital audio data or other time based streams of digital data.

One embodiment of the present invention involves a method to process digital audio data wherein digital audio data are displayed in one or more tracks along a time line in a graphical interface of a computer system; arrange regions are defined within the time line of the digital audio data as objects for manipulation; and tracks within a selected arrange region are processed as an entity in accordance with commands received through the graphical user interface.

In an embodiment, the arrange regions are defined to be contiguous over the timeline of the digital audio data; this allows to define the arrange regions to be adapted to the characteristics of the piece of music.

In a further embodiment, the arrange regions are named entities for ease of referencing the arrange regions.

In a further embodiment, a selected arrange region is moved within the time line under control of a pointing device (e.g. a mouse which controls the position of a cursor on a display) in the graphical user interface. This allows to easily and flexibly relocate specified portions of the piece of music, e.g. to rearrange the verse of a song within the song.

In a further embodiment, the selected arrange region is displayed in the graphical user interface with a standard symbol and a standard shape while it is being moved. This simplifies the manipulation of the arrange regions both for the user and the implementation of the invention.

In a further embodiment, the selected arrange region is inserted between existing arrange regions by directing the pointing device to the boundary between the existing arrange regions. This allows easy and precise targeting of the arrange region to be moved to the desired new location.

In a further embodiment, the selected arrange region is inserted behind the existing arrange regions. If a gap is created between the existing arrange regions and the moved arrange region, it is filled with an empty arrange region that can be filled with musical building blocks.

In a further embodiment, the selected arrange region is copied and the copy inserted between existing arrange regions by directing the pointing device to the boundary between the existing arrange regions under control of a modifier key.

In a further embodiment, the selected arrange region is caused to exchange positions with an existing arrange region by directing the pointing device over the existing arrange region.

In a further embodiment, the selected arrange region is caused to replace a part of an existing arrange region by directing the pointing device over the part of the existing arrange region to be replaced. These two preceding features allow to easily exchange or replace parts of the piece of music.

In a further embodiment, the pointing device is caused to change its shape in accordance with the operation performed on the selected arrange region. This feature further supports usability of the graphical user interface.

In a further embodiment, the contents of all arrange regions displayed on the graphical user interface are saved as a bit pattern before the selected arrange region is moved. Thereby at every instant the user is made fully aware of how the contents change when a selected arrange region is being moved although it is no longer visible during the move at its original position and although its movement affects the position of the remaining content.

In a further embodiment, a selected arrange region is maintained on the time line while the tracks within the selected arrange region are caused to be deleted. This feature allows a user to recreate the contents exactly within the limits of the original location of a selected arrange region by dragging new musical building blocks into the emptied region.

In a further embodiment, a selected arrange region is caused to be deleted together with the contents of the associated tracks and wherein the space of the deleted arrange region and its contents is filled by moving the following arrange regions to the left.

In a further embodiment, the digital audio data comprises automation tracks and wherein automation points are automatically inserted immediately before and after at the beginning and the end of a selected arrange region if the selected arrange region is moved from its original location to a new position. This feature makes sure that the content of the arrange region sounds the same when an arrange region is moved from its original location to a new position.

A preferred graphical user interface for processing digital audio data in accordance with an embodiment of the invention comprises fields to display the digital audio data as one or more tracks; a field to display a time line along the digital audio data; an arrange track extending over time line of the digital audio data; and a control field to generate at least one arrange region within the arrange track that can be selected to manipulate the digital audio data within the time line of the selected arrange region.

The present invention, in at least certain embodiments, has the advantage that the user of the DAW can immediately and flexibly manipulate complex parts of digital audio data in a multitude of tracks through a graphical user interface with an extended set of commands.

The present invention, in at least certain embodiments, provides the further advantage that the user obtains immediate graphic feedback of the result of his manipulating the digital audio data.

These embodiments may be implemented using a method, a program, a program product, a user interface, a computer system, a data processing system or a consumer electronic device or any combination of such implementations.

The present invention, its features and advantages will best be understood from the following detailed description of illustrative embodiments when read in conjunction with the accompanying drawings.

BRIEF DESCRIPTION OF THE DRAWINGS

The present invention is illustrated by way of example and not limitation in the figures of the accompanying drawings in which like references indicate similar elements.

FIGS. 2A to 2C show three appearances of the GUI when an arrange region is moved within an arrange track in accordance with an embodiment of the invention.

FIGS. 5A to 5C show three appearances of the GUI when an arrange region is deleted in destructive move.

FIGS. 6A to 6C show three appearances of the GUI when an arrange region is moved after the end of the rightmost arrange region on the arrange track.

DETAILED DESCRIPTION

Figure 1:
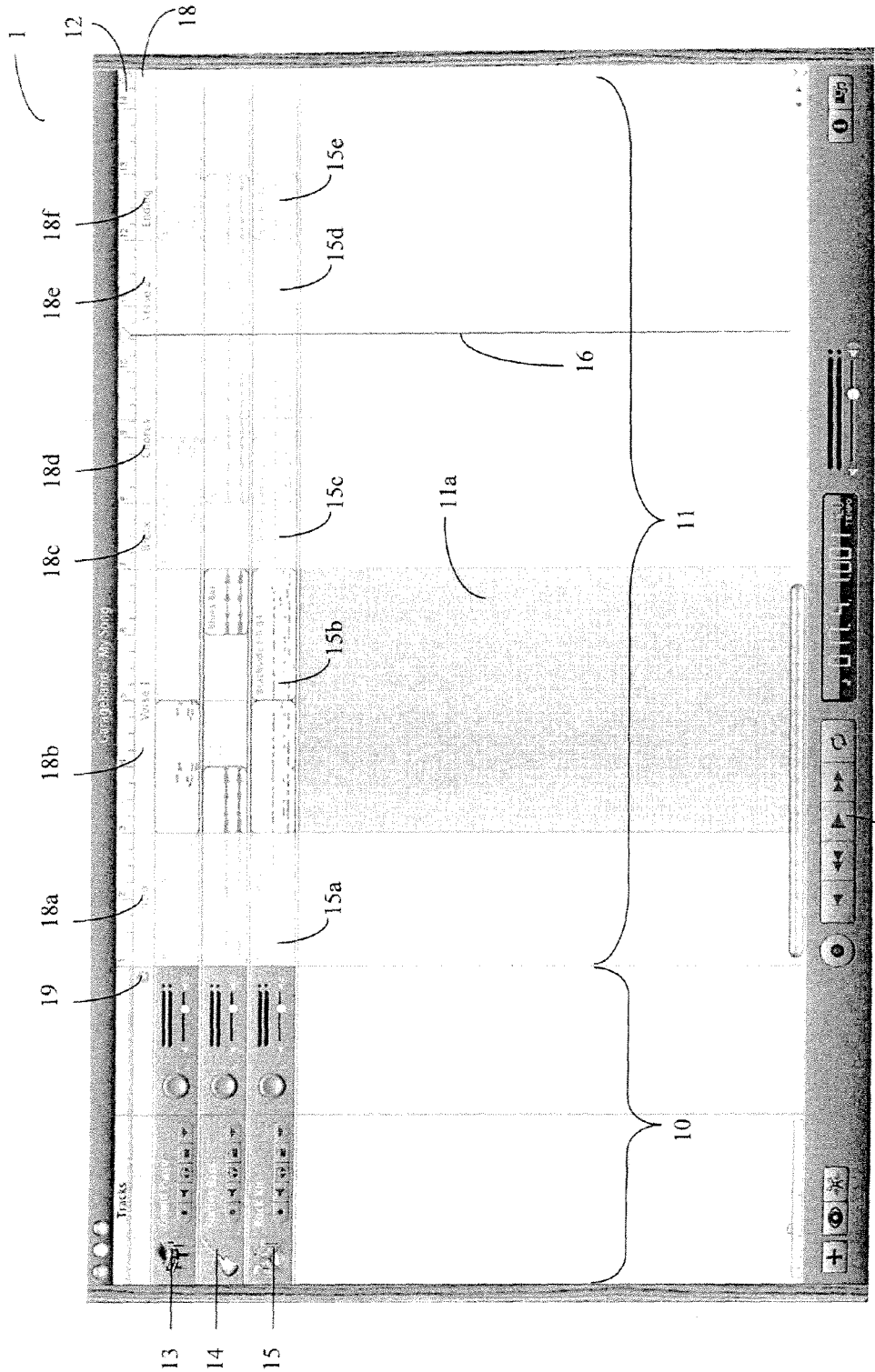
FIG. 1 shows a graphical user interface GUI to create and manipulate a piece of music in accordance with an embodiment of the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

In the following detailed description of exemplary embodiments of the invention and in the figures, the same elements and components are designated by the same terms and the same reference numerals.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc., 2007.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CDROMs, and magneticoptical disks, readonly memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

FIG. 2B of U.S. Pat. No. 6,222,549, which is hereby incorporated herein by reference, shows one example of a data processing system, such as a computer illustrates various components of a data processing system, it is not intended to represent any particular architecture or manner of interconnecting the components as such details are not germane to the present invention. It will also be appreciated that network computers, personal digital assistants (PDAs), cellular telephones, handheld computers, special purpose computers, entertainment systems and other data processing systems and consumer electronic devices which have fewer components or perhaps more components may also be used with the present invention. The system of this Figure may, for example, be a Macintosh computer from Apple Inc.

A machine readable medium includes any mechanism for storing or transmitting information in a form readable by a machine (e.g., a computer). For example, a machinereadable medium includes read only memory ("ROM"); random access memory ("RAM"); magnetic disk storage media; optical storage media; flash memory devices; electrical, optical, acoustical or other form of storage systems.

It will be apparent from this description that aspects of the inventions may be embodied, at least in part, in software. That is, the techniques may be carried out in a computer system or other data processing system in response to its processor or processing system executing sequences of instructions contained in a memory, such as RAM, etc. In various embodiments, hardwired circuitry may be used in combination with the software instructions to implement the present inventions. Thus, the techniques are not limited to any specific combination of hardware circuitry and software, nor to any particular source for the instructions executed by the data processing systems.

A preferred embodiment of the invention is based on the software product GarageBand manufactured by Apple Inc. for use in a personal computer. Details of this product are described e.g. by Mary Plummer in "Apple Training Series GarageBand" (Apple Training) ISBN-10: 0321421655 and by David Pogue in "GarageBand 2: The Missing Manual"

ISBN-10: 0596100353, which are incorporated herein by reference. It is understood, however, that the invention is not limited to this particular implementation and can be used with minor modifications in any DAW system or other data processing system.

An embodiment of the invention will be first described in its external characteristics as controlled by the user through the graphical user interface and then in its essential internal structures and operations. Functions and components well known to the expert in the field of digital audio processing are not described in detail for clarity and conciseness.

FIG. 1 shows a schematic diagram of the basic graphical user interface GUI 1 which is used to control the operation of the preferred embodiment of the invention. One instantiation of such a GUI structure is used for one piece of music and can be named (e.g. as My Song in FIG. 1). A processed GUI and it associated internal data can be saved as a digital file in a permanent storage when the operation of the DAW is terminated, either when the operation of the DAW is terminated or at any intermediate point of the creation. The stored data comprise the audio information as well as control information (so called automation information) in one or more digital files which may be used to play back the song or other audio data.

In the preferred embodiment the computer stores the digital representation of the created piece of music in AIFF format (Audio Interchange File Format). Other formats can be used alternatively, e.g. in MP3 or other digital audio formats as well as in MIDI format (Musical Instruments Definition Interface), either directly or after compression.

An empty GUI 1 is displayed as a window on the screen of a computer when a new piece of music is to be created. The GUI comprises two main fields: a header field 10 for receiving information about the instrument selected by the user and an arrange field 11 for receiving audio building blocks created and edited or selected by the user. The arrange field 11 has at its top a time scale 12 indicating the bars for the piece of music.

The instruments available in the GUI and the pre-stored musical building blocks are presented to the user in a selection menu (not shown in FIG. 1), e.g. a drop-down list, a button matrix or a file browser for dragging a selected item into the header field and the arrange field 10 at a position following the header for the selected instrument, respectively. The area following the track header is also called the track space. The user either creates musical building blocks for the track space of a specified track (instrument) by recording his own performance or by selecting a musical building block from a factory-delivered set of blocks.

A header in the header field and its associated track space for the musical building blocks form one row or a horizontal track in the arrange field 11 of GUI 1. A piece of music may comprise a substantial number of such tracks which are shown in GUI 1 as a vertical stack. New tracks may be added below the last existing track and existing tracks may be deleted or sorted. The sum of all tracks makes up the arrange field 11. Each track header comprises conventional controls for individually setting the audio characteristics of the track (volume, pan, mute, etc). These header controls operate only on the track itself and on the track as a whole.

In addition to the overall audio control, each track may have one or more associated control tracks with automation data for the musical building blocks in the associated track. Such automation data and parameters allow e.g. to vary the volume and/or the pitch, reverb level, fade etc in the track at different positions, i.e. at different points of time. The automation data are associated with the track, not with the individual musical building blocks. The information in automation tracks can relate to software instrument automation data, real instrument automation data and master track automation data. Automation tracks are not shown in FIG. 1 for simplicity.

Different types of musical building blocks (also called regions) are available for selection: Real Instrument (RI) regions which contain music phrases that are pre-recorded with a real instrument of the type indicated by the header; Software instruments (SI) regions with synthetic musical phrases in MIDI format. RI and SI regions may not be mixed in a single track. The user can create RI and SI regions by recording his own performance. In addition he can select from a variety of pre-installed or purchased building blocks. The Apple GarageBand product e.g. provides pre-installed building blocks called Apple loops, which are SI or RI regions with certain metadata (e.g. tempi, beat number, time signature, genre of music to be played, the instrument, the mood and possibly other characteristics).

In the example of the GUI 1 in FIG. 1, the user has selected three instruments (Grand Piano, Sixties Bass and Rock Kit) and thereby three tracks 13, 14, 15 were created. For track 13 (the grand piano) the user has selected a musical building block "Blues Bar 05" which is represented in piano roll notation. The user has chosen to repeat the building block "Blues Bar 05" for the length of four bars followed by a pause before it is again repeated.

For track 14 (the Sixties Bass), the user has selected the building block "Blues Bar Bass 02.1", which is a RI region and is shown here as a waveform. This building block extends over the first three bars and is followed by a pause before it repeats again with bar 6.

In track 15 (the Rock Kit), the building block 15*a* "Beach Side Drum Set 2.0", which is a MIDI file in piano roll notation, extends from the beginning to bar 5 and is then extended with building block 15*b* "Beachhead fill" until bar 7. A copy of building block 15*c* follows until bar 11 and a building block 15*e* with an intermediate gap 15*d*.

For playing back the piece of music as defined by the selected instruments (headers) and musical building blocks, conventional audio control buttons 17 are provided at the bottom of GUI 1. The state of playback is indicated by a playhead 16, which moves across the arrange field as the piece of music progresses. Any change in the selection of instruments (headers), musical building blocks, their length, repetition rate or the audio characteristics can thus be observed directly in the GUI 1 and checked by immediate playback of one of the tracks alone or in combination with other tracks.

During the creation of a new song or after it has been finished the user may want to modify the song by adding, changing or deleting specified parts of the song. The modification of the composed song has often to be reflected in each of its tracks (which may be many) and possibly in each of the building blocks of each track. It has to be noted that the musical building blocks are not in a fixed format and of equal length but vary in accordance with the choices by the user.

If e.g. it is desired to delete a part of a song altogether or move or copy a complete part to a different position in the track (i.e. change the timeline), the musical building blocks in each track of the affected part of the song have to be manipulated individually both at the original and the receiving positions. This is a complex, cumbersome and error prone process, which exceeds the skill to be expected of any but very sophisticated users.

The present invention addresses this problem and provides an arrange track 18 in the GUI 1 as a new control element. Preferably, the arrange track 18 is located, in one embodiment, just below the time scale 12 in the arrange field 11. The arrange track can be selected in the GUI as being shown or hidden.

The arrange track 18 comprises a control element 19 in the header field 10 to create arrange regions AR 18a, 18b, 18c, etc. within the arrange track 18. In the example of GUI 1 this control element is a plus sign and its activation causes the creation of a new arrange region AR adjacent to the last existing arrange region AR.

The arrange regions are created with a default name and with equal length of e.g. eight bars and they are contiguous without gaps in between. After its creation an AR can be renamed and its length be changed (while maintaining the contiguous nature of the arrange regions, i.e. extending an AR reduces the length of the neighbouring AR). Changing the length of an arrange region has no influence on the contents of the track spaces in the arrange field 11.

In the example of GUI 1 six arrange regions AR have been created and then changed to individual lengths in accordance with the structure of the piece of music "Intro" for AR 18a, "Verse 1" for AR 18b, "Break" for AR 18c, "Chorus" for AR 18d, "Verse 2 for AR 18e" and "Ending" for AR 18f.

The arrange track AT 18 covers in horizontal direction the complete track of the piece of music in the arrange field 11. In vertical direction an arrange region AR covers the complete underlying area of the arrange field 11 and allows to manipulate the covered area as one entity. In the example of GUI 1 the arrange region 18b "Verse 1" has been selected and covers the area 11a which is highlighted in light grey. The timeline of a piece of music may be covered completely or in parts by arrange regions.

After one or more arrange regions have been defined, they can be manipulated individually or in combinations of contiguous arrange regions in accordance with the teaching of the present invention. Discontinuous arrange regions cannot be manipulated together in at least certain embodiments. The arrange regions AR can be chosen irrespective of the boundaries of the musical building blocks. Building block 15a e.g. is shown to be only covered in its right part by the arrange region 18a. Arrange regions may be split or joined. Shortening, lengthening, joining or splitting arrange regions in the arrange track 18 does not affect the contents of the associated song or arrangement but allow to precisely adapt the arrange region to the characteristics of the song or arrangement. An arrange region may be deleted by moving one of its boundaries over the other so that its length is reduced to zero. The underlying content is again not affected.

The following describes the basic operations of moving, copying and deleting arrange regions as provided by the present invention and controlled by commands received through the GUI 1. These operations do not change or alter the musical content of the manipulated arrange regions (except of course in the case of deletion).

Figure 2C:
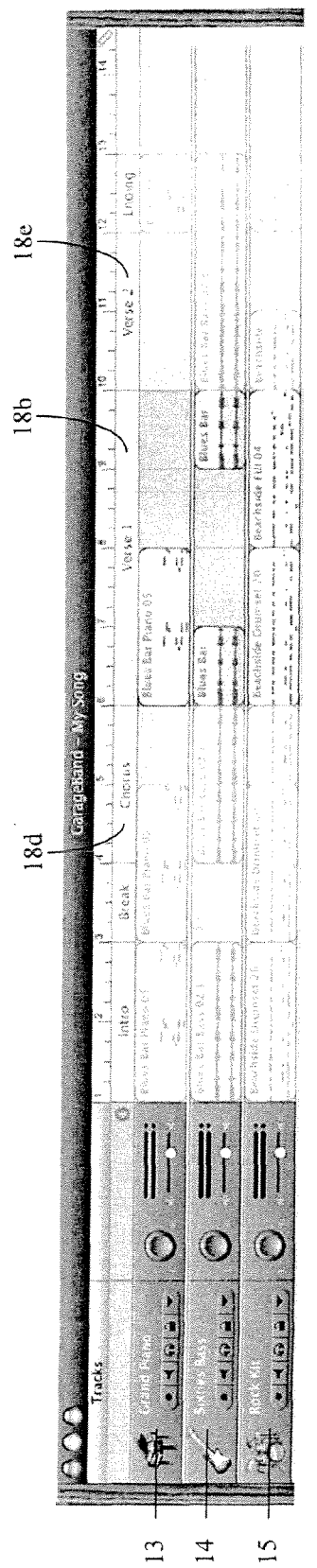

FIGS. 2A to C show the operations of shifting a selected arrange region 18b "Verse 1" from its original position at bar 3 on the time scale to its new position at bar 6 (highlighted in light grey in FIG. 2B). Shifting is effected by, in one embodiment, a click (to select), drag (to move) and drop (to insert) manipulation of the arrange region with a pointing device, such as a mouse. When the arrange region 18b is selected to be moved out of its original position (FIG. 2A), its symbol and its area are in GUI 1 are changed to a standard symbolic value 20a and 20b, respectively (irrespective of its actual length i.e. its actual duration). The moved arrange region is dropped at the target position (FIG. 2B) in between two other arrange regions, namely 18d "Chorus" and 18e "Verse 2". The arrange region 18b "Verse 1" is then again displayed in its original length (FIG. 2C) and comprises exactly the same musical building blocks (or parts of it) that were defined at its original position. When a selected arrange region is moved out of its original position, the gap 20a in the timeline at the original position is closed by shifting the following arrange region ("Break") to the left into contact with arrange region 18a "Intro". At the target position as defined by the pointing device, a symbolic gap 20b is displayed (FIG. 2B) until the moved arrange region 18b has reached its final position and is again shown in full. For the move operation the cursor may retain its regular shape of an arrow.

Figure 3A:
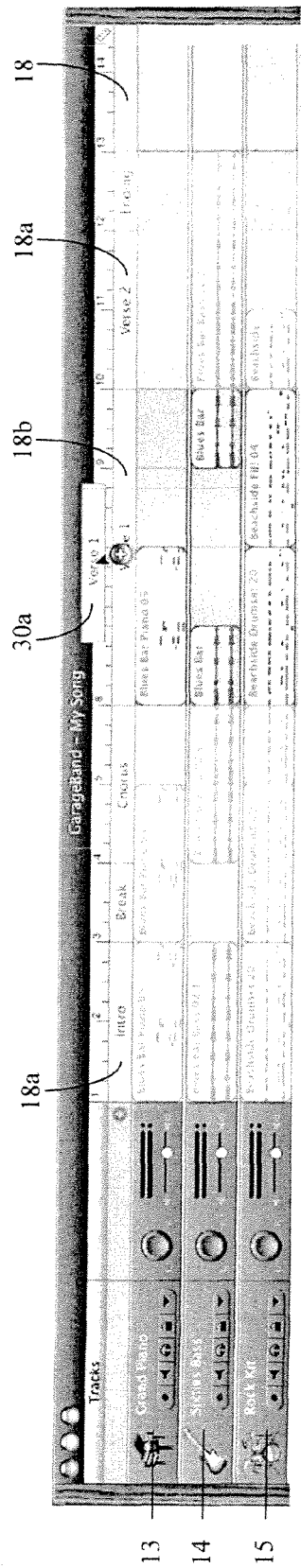
FIGS. 3A to 3C show three appearances of the GUI when an arrange region is copied and inserted within an arrange track.
Figures 3B, 3C:
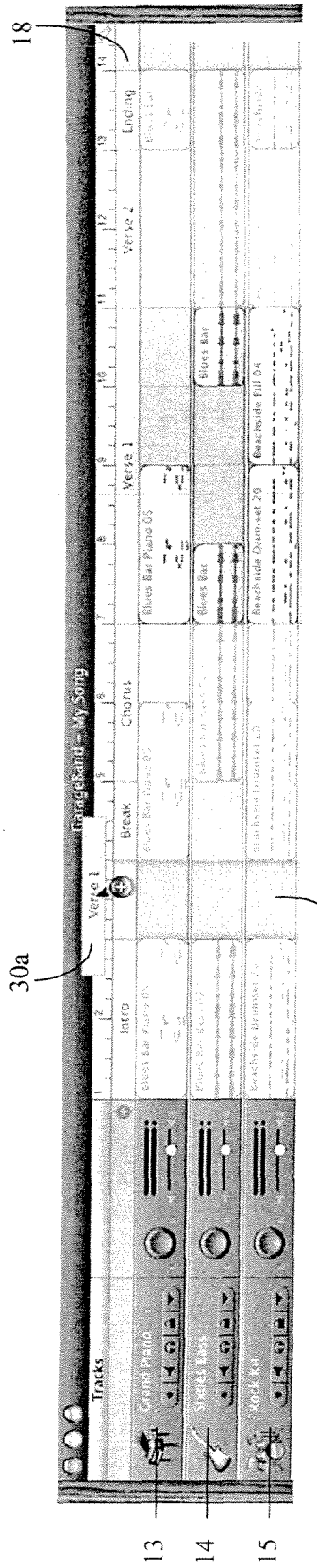

FIGS. 3A to C show the operations of copying an arrange region and inserting the copy in between two other arrange regions. In this example, the arrange region 18b "Verse 1" in its new position reached in FIG. 2C just before the arrange region 18 is copied back to its original position right behind arrange region 18a "Intro". The operations of selecting and displaying intermediate operations of the operation are the equivalent to those described with respect to FIGS. 2A to 2C with the exception that the standard symbol 30a for the selected arrange region shows a modified form of the cursor head with a +-sign after the arrange region has been clicked with a modifier key to initiate the copying function rather than the moving function. Since a copying function is involved, no gap is shown at the original position of the copied arrange region but a symbolic gap at the position of the copy (FIG. 3B). FIG. 3C shows the result of the copying operations with arrange region 18b appearing twice in the arrange track 18. The length of the song has obviously been increased by the copying operation by 4 bars.

Figure 4A:
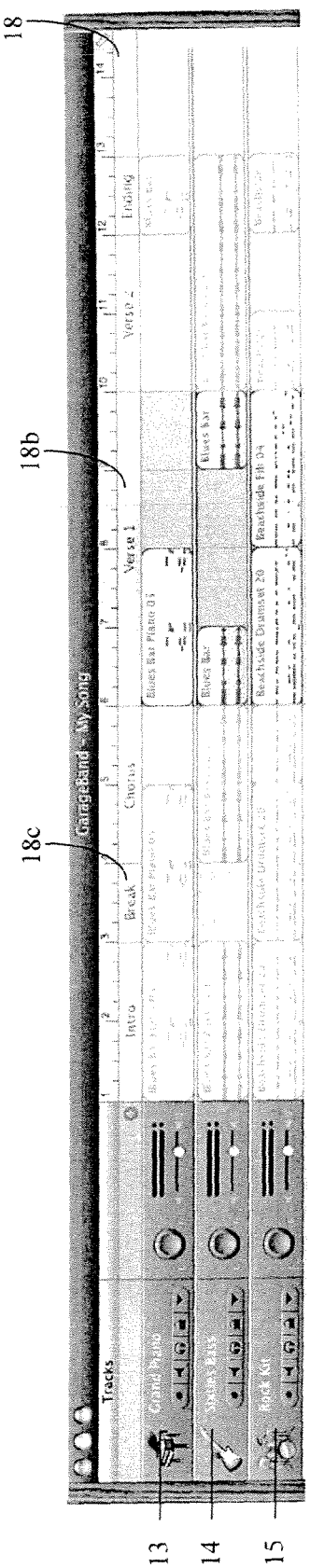
FIGS. 4A to 4D show four appearances of the GUI when an arrange region is exchanged.
Figure 4B:
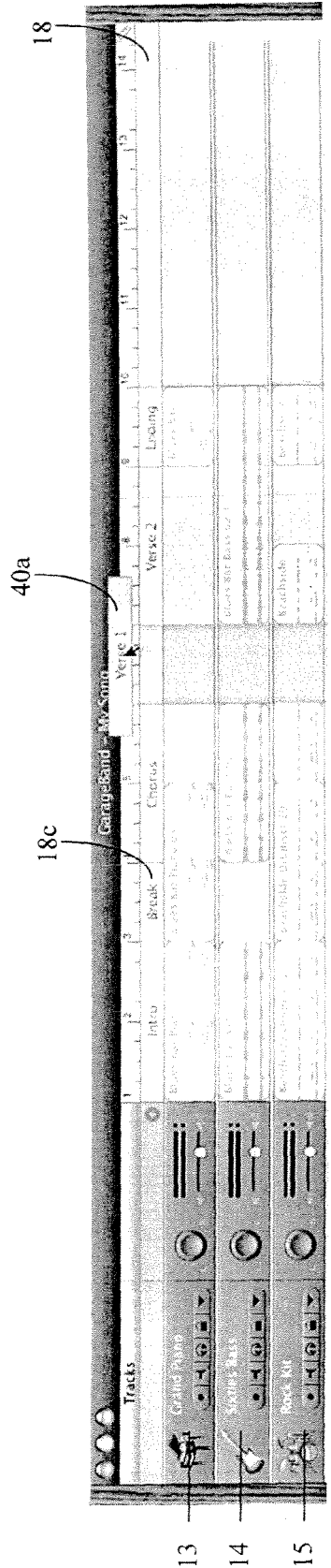
Figure 4C:
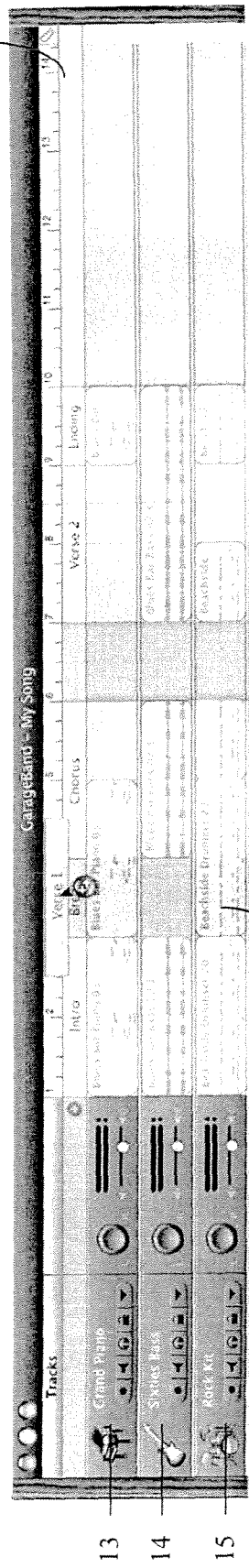
Figure 4D:
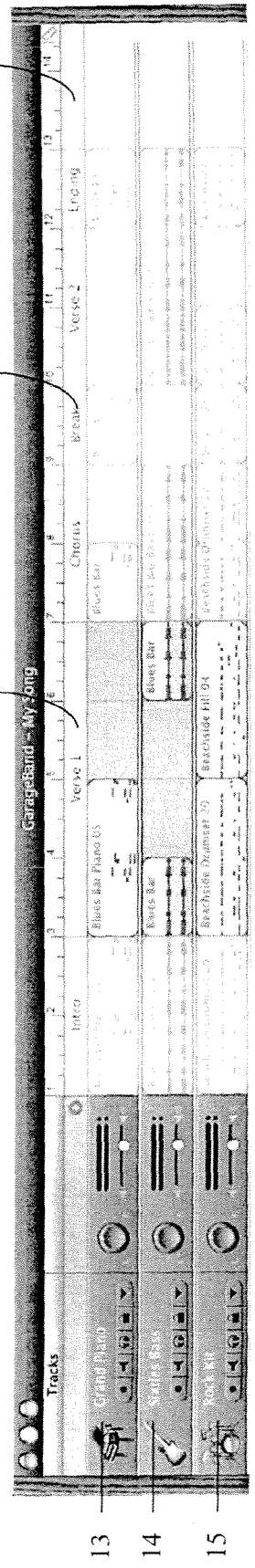

FIGS. 4A to 4D show the operations of exchanging an arrange region in one operation. In the example of FIG. 4A the arrange region 18b as moved in FIG. 2C is to be exchanged with the arrange region 18c "Break". In equivalent operations as in the previous operations, the arrange region is selected and dragged over the arrange region 18c to be exchanged (rather than being dragged in between two arrange regions as e.g. in the copy operation). The standard symbol 40a for arrange region 18b in the exchange operation shows the exchange symbol "double arrow" on the cursor (FIG. 4B) and the arrange region 18c to be exchanged is highlighted (FIG. 4C). After dropping the standard symbol on the selected arrange region 18b, the two arrange regions are exchanged by inserting the second arrange region 18c "Break" into the gap left by the first arrange region 18b "Verse 1". The result of the exchange operation is shown in FIG. 4D with the new sequence of arrange regions "Intro", "Verse 1", "Chorus", "Break" "Verse 2" and "Ending". The length of the song has obviously not been changed.

Figure 5A:
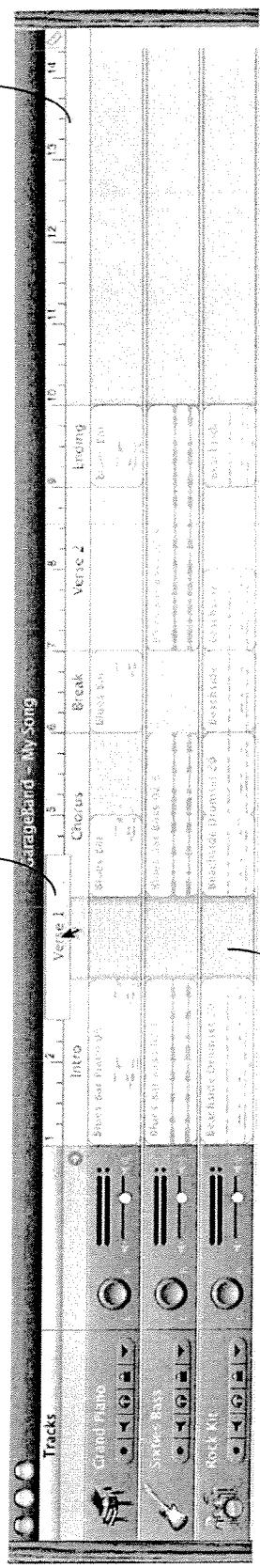
Figure 5B:
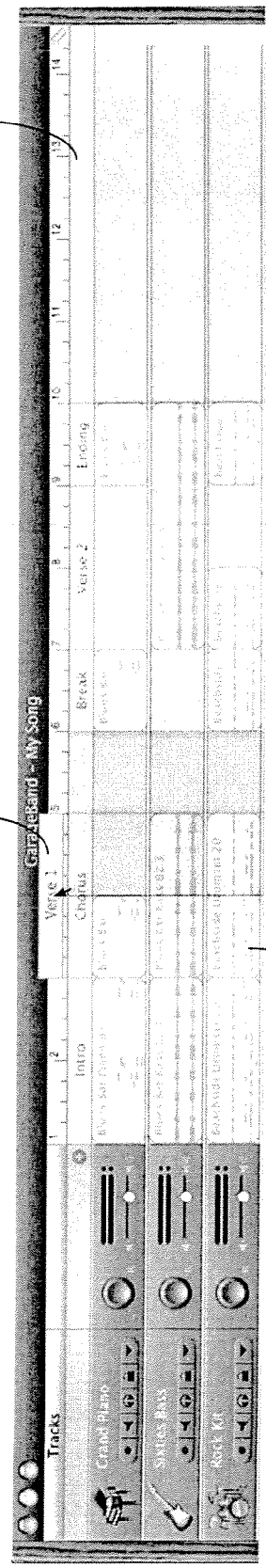

FIGS. 5A to 5C show the operations of replacing an arrange region in a destructive move operation. FIG. 5A corresponds to the situation of FIG. 4D and shows the arrange region 18b highlighted with the standard symbol and the standard gap 50 after the selected arrange region has been moved. In FIG. 5B the standard symbol has been dragged partly over the arrange region 18C "Chorus" while a modifier key is pressed and covers the part of the arrange region to be replaced. After dropping the symbol 50a of arrange region 18b "Verse 1" the highlighted part of arrange region 18d "Chorus" is replaced by the moved arrange region 18b "Verse 1". FIG. 5C shows the result of this operation destructive move; the partly deletion of the arrange region 18d by one bar has reduced the total length of the song accordingly.

Figure 6B:
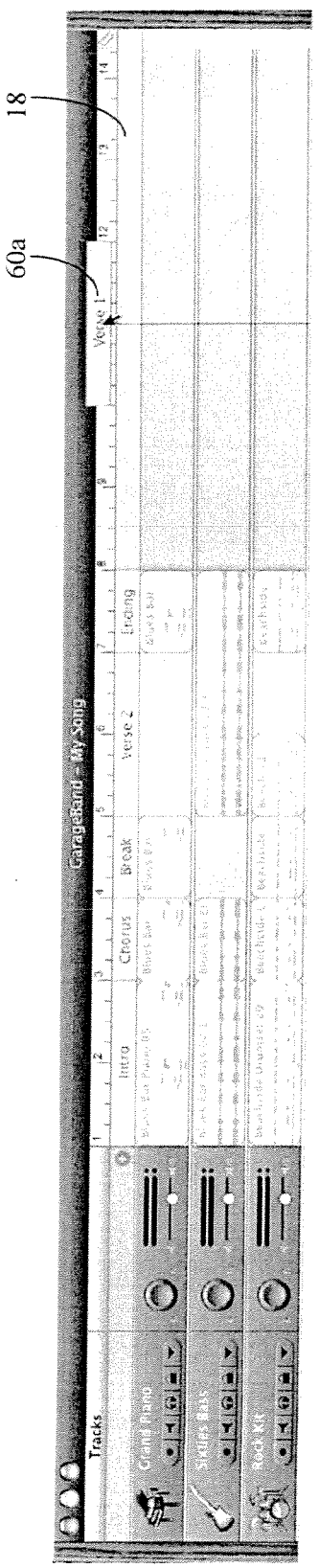
Figure 6C:
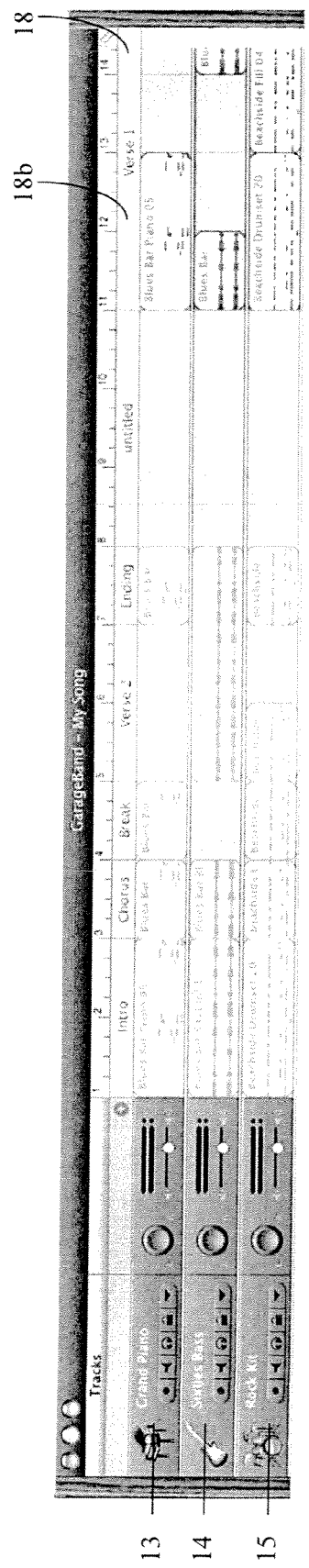

FIGS. 6A to 6C show the operations of moving an arrange region outside the area of the original piece of music to create a gap in between the current end of song and the moved arrange region. In FIG. 6A, which corresponds to the situation in FIG. 5C, the arrange region 18B "Verse 1" has been selected and moved so that it is indicated by the standard symbol 60a and the standard gap 60b. As shown in FIG. 6B the standard symbol is dragged outside the area of the song in the arrange track 18 and dropped there (in FIG. 6B at bar position 11), where it appears in its original shape. The length of the original song has thus been reduced to 7 bars, a gap of 3 bars has been created (which is filled with an empty arrange region into which new musical building blocks can be dragged and dropped) and the length of the new song has thereby been increased to 14 bars.

If an arrange region is to be deleted within a piece of music, a two-operation process is provided. Selecting an arrange region and operating a delete key (e.g. backspace) will only delete the track contents within the arrange field 11, but not the arrange region itself within the arrange track 18. Therefore new contents can be dragged into the now empty track space. To delete an arrange region from the arrange track 18 altogether (and the contents of the selected arrange region), in one embodiment, the selected arrange region has first to be emptied and then the deletion key be operated a second time. In another embodiment, deletion of the arrange region from the arrange track can be effected by operating a delete key (e.g. backspace) together with two modifier keys (e.g. the command and the option key in an Apple computer). After the complete arrange region is deleted the remaining gaps in the timeline content are closed automatically, in one embodiment, by moving the remaining arrange regions together.

In the discussion so far, the arrange regions were discussed with a view on the track space of the tracks in the arrange field. Limiting the manipulations on the musical contents, i.e. the musical building blocks, would yield, however, unsatisfactory results in the final version of the piece of music. The invention, in one embodiment, therefore manipulates the automation tracks as well to achieve optimum audio results.

Since the position and the length of an arrange region 18a, 18b etc can be defined arbitrarily, its boundaries define cut lines in musical building blocks at the periphery of the arrange region and in the associated automation tracks. Cutting a track space is possible at any position of the musical building blocks without or with little negative effects on the audio quality. However, cutting an automation track requires that new automation points are set at the cut lines so that after moving an arrange region the automation data before, inside and after the arrange regions give the same result as if the arrange region would not have been moved.

Details of cutting an automation track are now explained with reference to FIG. 7A which shows an automation track associated with an audio track for controlling its volume V as a position of the time scale t. In the example four automation points 1, 2, 3, 4, 5 cause the volume V to be first linearly reduced (up to automation point 2), then linearly increased (to point 3), reduced (to point 4) and again increased to point 5.

Figure 7A:
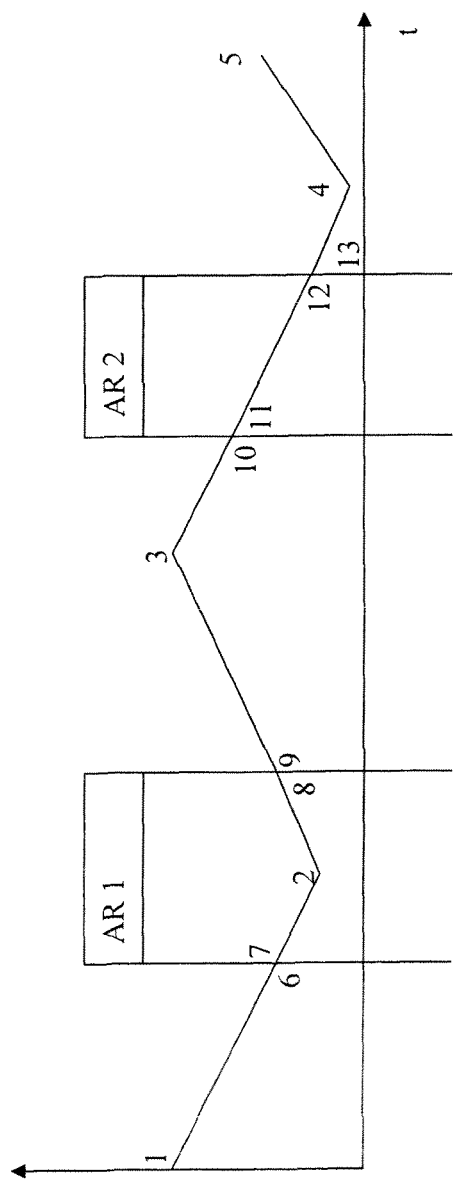
FIGS. 7A to 7C show examples of automation tracks associated with an audio track and automation points inserted in accordance with an embodiment of the present invention.
Figure 7B:
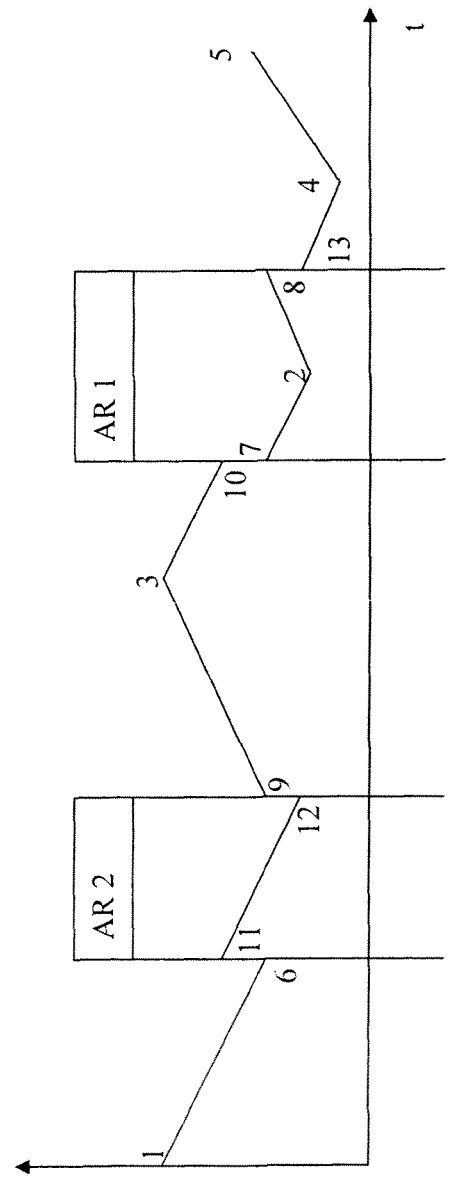

Two arrange regions in FIG. 7A are designated by AR1 and AR2. The boundaries of these arrange regions define new automation points just outside and just inside their boundaries, e.g. automation points (6, 7) of arrange region ART. Similarly new automation points (8, 9) at the right boundary of AR1 and automation points (10, 11) and (12, 13) in AR2 are created. In FIG. 7B the arrange regions AR1 and AR2 have been exchanged. When an arrange region is moved, its inner automation points are carried along in one embodiment. Thus in FIG. 7B, arrange region AR2 that has been moved to the original location of arrange region AR1 carries its inner automation points 11, 12 so that at the left boundary of displaced arrange region AR2 automation points (6, 11) are present and at its right boundary automation points (12, 9). Similarly displaced arrange region AR1 carries with it automation points 7, 2 and 8 so that at its new location pairs of automation points (10, 7) and (8, 13) appear at the boundaries. The automation points of each pair at a boundary are then connected to generate an uninterrupted automation line. The user can manually process the new automation points if desired.

Without the insertion of new automation points in accordance with the invention, the DAW would create a new automation line by linearly interpolating between the original automation points as they appear after the displacement of an arrange region. In the example of FIG. 7B, this would result in an automation line extending from automation point 1 to automation point 3, from point 3 to displaced automation point 2 and from displaced automation point 2 to automation point 4.

Figure 7C:
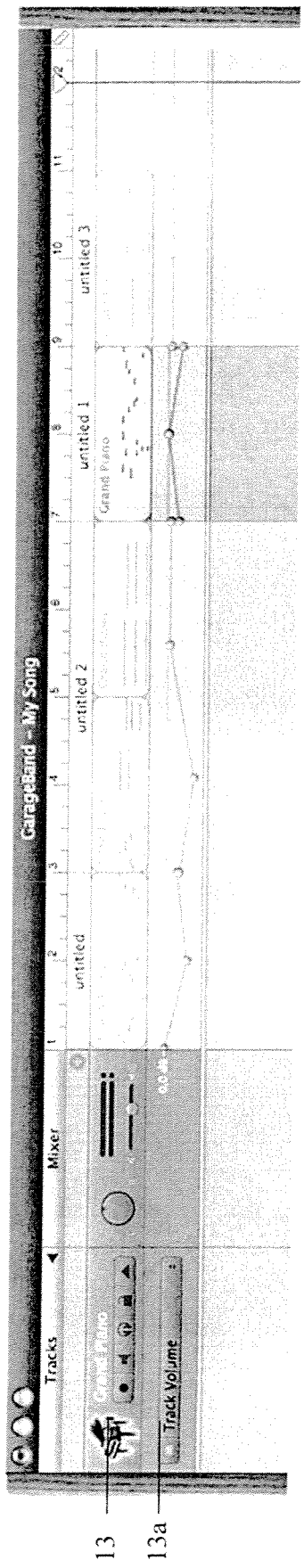

FIG. 7C shows as an example track 13 for Grand Piano of FIG. 1 with an associated volume automation track 13a "Track volume" after the arrange region "untitled 1" has been moved from the position preceding arrange region "untitled 2" to a position behind. In the highlighted area 70 of arrange track "Untitled 1" the new automation points are clearly visible at the boundaries of arrange region "Untitled 1".

A particular advantage of one embodiment of the present invention is that the GUI 1 allows to graphically display every phase of the manipulations as described with reference to the previous figures. As a further advantage, the contents of arrange regions can be shown on GUI 1 while it is being moved from one position to the next. For simplicity of design, a preferred embodiment saves a bit map (screen shot) of the arrange field 11 before the moving operation and manipulates this saved bit map for displaying the operation on the GUI 1 while the operation on the arrange regions is being performed.

Since the present invention also allows playing back of the audio tracks of GUI 1 while they are being manipulated, confusion by displaying the manipulated saved bitmap can be avoided by hiding the playhead during playback so that there is no inconsistency between the position of the playhead and the played back position.

The graphical interface GUI 1 of the invention and its new functionalities are preferably implemented by expanding a Digital Audio Workstation DAW known in the art.

Figure 8:
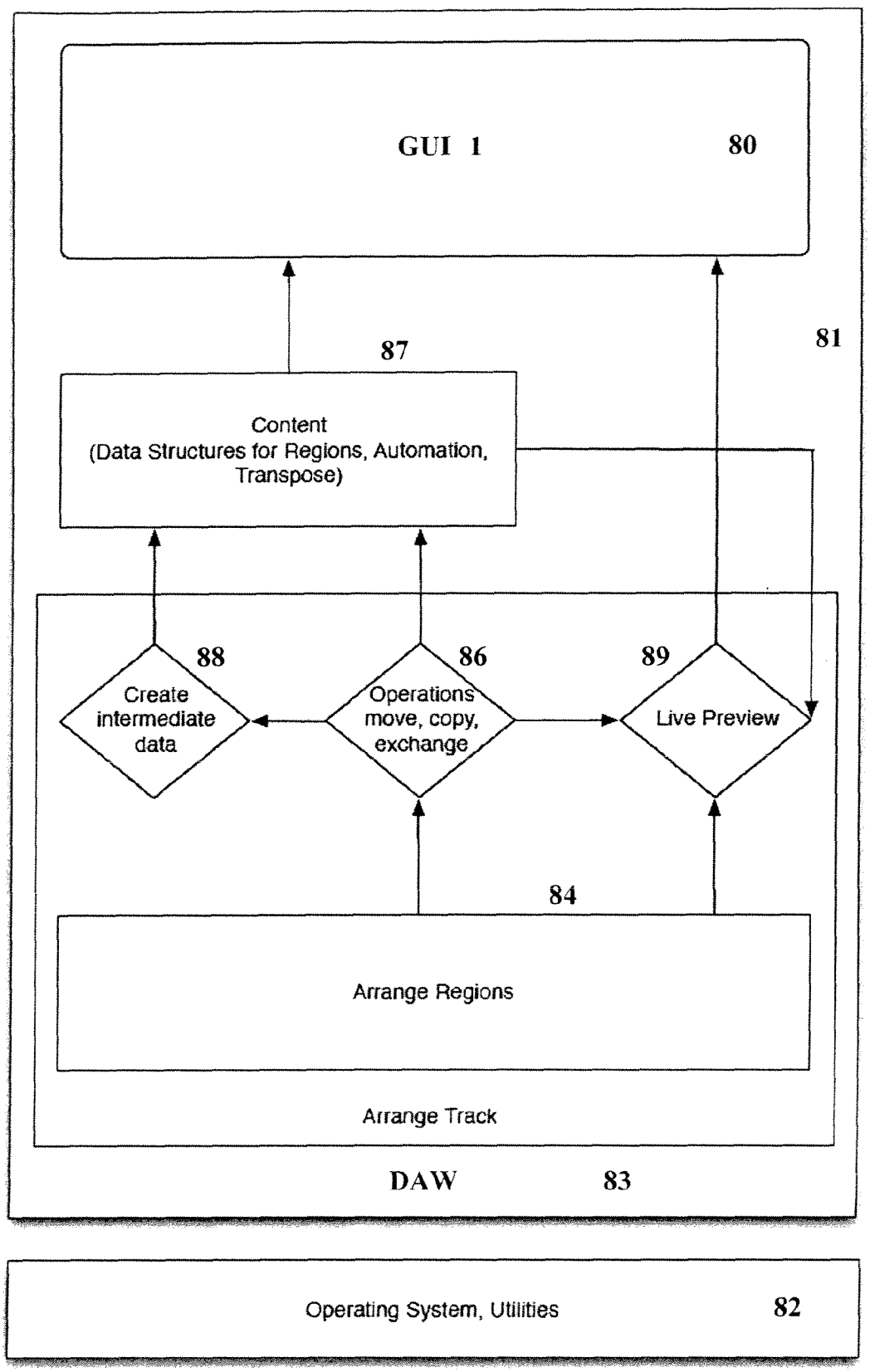
FIG. 8 shows a schematic block diagram with the components of the present invention as implemented in a digital general purpose computer.

FIG. 8 shows a schematic block diagram with an embodiment of the invention as implemented in a known digital data processor. The DAW comprises a set of programs to create and manipulate audio information in the form of tracks and musical building block contained in each track.

The graphical user interface GUI 1 in accordance with the invention is displayed on the monitor 80 of the digital audio processor. The monitor 80 is operationally connected with program modules and data structures stored in the main memory 81 of the digital audio processor.

Main memory 81 contains operating system functions and utilities 82 that can be used by the invention. The tracks represented in the GUI 1 are stored in main memory as digital audio files comprising the above discussed formats (AIFF, MIDI, etc) and control information. These files can be manipulated, changed, split, joined, compressed and stored as instructed by the GUI commands, e.g. using the file handling facilities of the operation system in the computer of the DAW.

Main memory 81 further contains software 83 for a digital audio data processing system which the invention sets out to improve, e.g. GarageBand. Part of this conventional software is a data field 84 which contains structural information for the arrange track and the arrange regions of the GUI 1 that is to be displayed on monitor 80. This structural information is enhanced and expanded by the arrange regions taught by the present invention.

Main memory 81 further contains software routines for performing the method in accordance with the present invention.

Program routine 86 performs functions in which arrange regions are moved or displaced relative to the time line in the graphical user interface GUI 1. Routine 86 is therefore operationally connected to data area 84, from which it receives its input. Since moving an arrange region has to be reflected in the files of the digital audio data, routine 86 is further connected to a routine 88 which creates intermediate digital audio data in accordance with the displacement operation requested for a specified arrange region.

The output of routine 88 is fed into data area 87 to modify the display data for GUI 1 on monitor 80. Data area 87 comprises all information for all tracks to be displayed on monitor 80, e.g. arrange regions, audio information and automation data.

A further software routine Live Preview 89 is provided in main memory 81 in accordance with one embodiment of the present invention to control the GUI 1 dynamically while operations on arrange regions are being performed. Routine 89 obtains input on structural data from data area 84, GUI display data from data area 87 and update information from routine 86. The dynamic display data is fed by routine 89 to monitor 80 and comprises data to display the standard value and the standard gap of a moving arrange region; further comprised may be data to be displayed on monitor 80 for graphical feedback on the operation being performed and based on a bitmap of arrange field 11 stored before the operation.

Further program routines (not shown in FIG. 8) are provided to perform functions like adding and renaming arrange regions or deleting the contents of arrange regions without deleting the arrange region from the arrange track.

Figure 9:
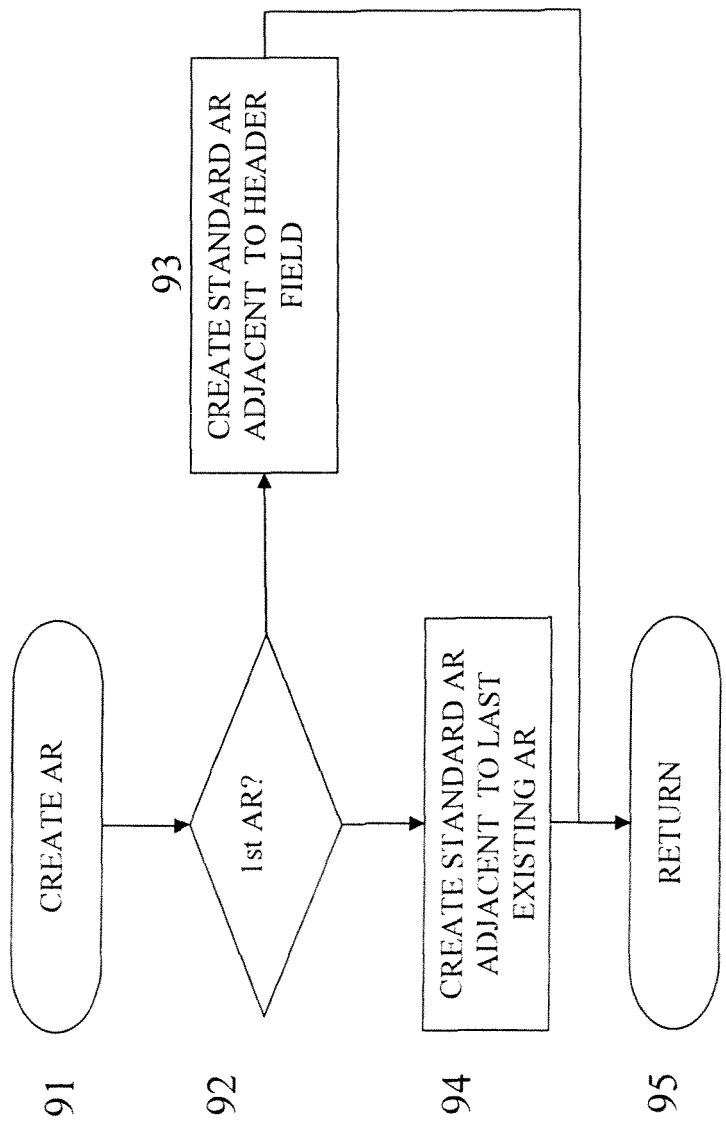
FIG. 9 shows a schematic flow diagram of a routine to create an arrange region on the arrange track in accordance with an embodiment of the present invention.

FIG. 9 shows a schematic flow chart of a process, in one embodiment, for creating an arrange region AR in the arrange track 18. The corresponding routine in the system of FIG. 8 is invoked by the activation of the create symbol 19 in the header of the arrange track 18.

Create routine 91 first checks in operation 92 whether the requested arrange region will be the first in an empty arrange track 18. If yes, the new arrange region is created in operation 93 adjacent to the header section of the arrange track 18, i.e. at the beginning of the piece of music at bar 1. Then the routine returns in operation 95 to the invoking program.

If the arrange track 18 already contains one or more arrange regions AR, the new arrange region is created in operation 94 adjacent and without intervening gap to the last existing arrange region. New arrange regions are created with a standard length and default names with consecutive numbers and are displayed in the GUI 1.

Figure 10:
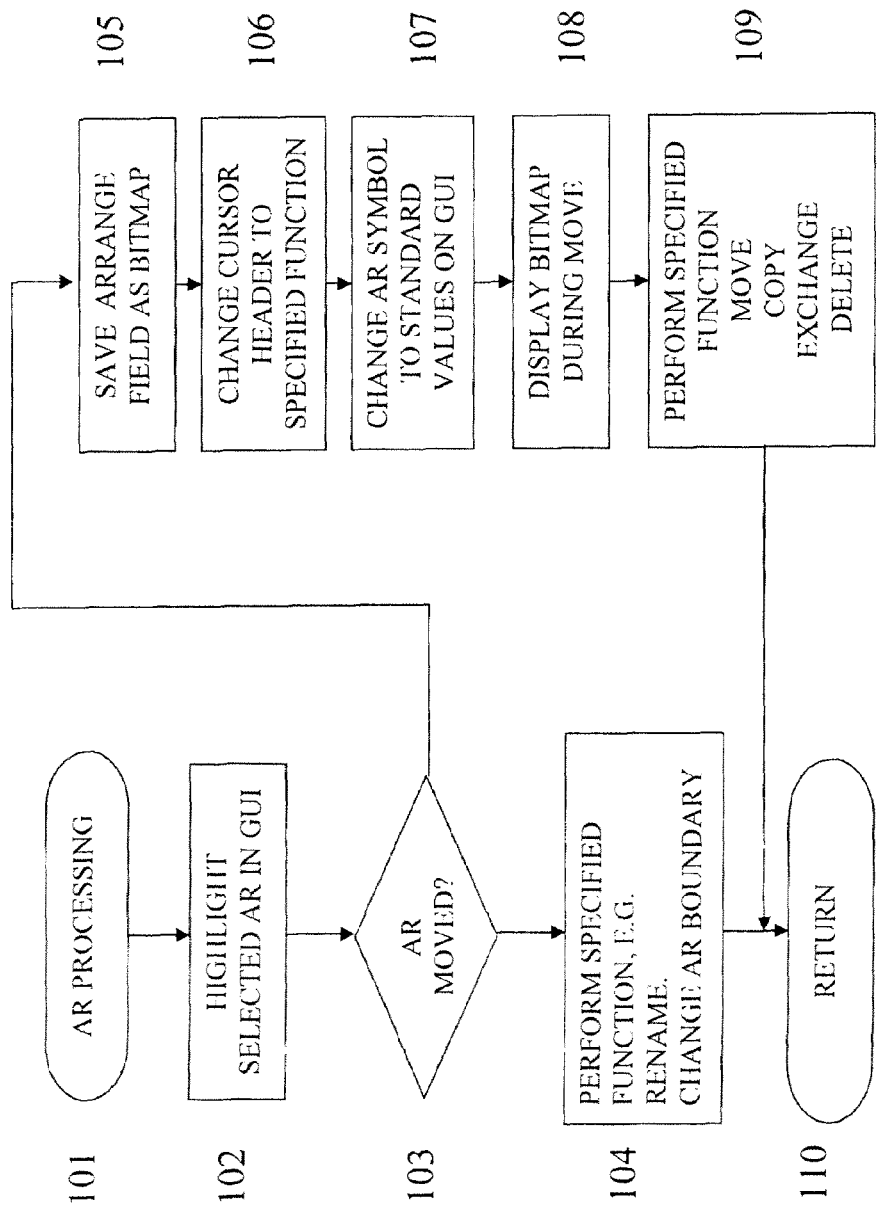
FIG. 10 shows a schematic flow diagram of a routine to manipulate arrange regions in accordance with an embodiment of the present invention.

FIG. 10 shows a schematic flow diagram of one embodiment of the general routine 101 to process arrange regions AR in the system shown in FIG. 8. Some of the operations need not be performed in the order shown in FIG. 10.

The AR processing routine 101 controls in operation 102 the GUI to highlight the arrange region AR selected by a pointing device, e.g. a mouse. An operation 103 checks whether the operation requested by the pointing device on the GUI involves moving the selected arrange region, e. g. a move, copy or exchange operation. If not, the specified operation not involving a move is performed in operation 104, e.g. a change of the name of the arrange region, a shift of one of its boundaries or other operations.

If the specified operation involves moving the selected arrange region, operation 105 stores the current bitmap of the arrange field as displayed on GUI 1. In operation 106 the header of the cursor on GUI 1 is changed in accordance with the specified operation, e.g. to a double arrow in case of a specified exchange operation. Operation 107 controls GUI 1 to replace the selected arrange region on GUI 1 by a standard symbol and a standard gap to indicate the original position of the moved arrange region.

In operation 108 and throughout the moving of the selected arrange region from its original position to a new position, GUI 1, in one embodiment, is controlled to display a real-time preview of the operation performed by manipulating the bitmap of the arrange field 11 that was stored before the move. The user thereby receives any time during the operation a full graphic feedback on the progress of the operation by the display on the GUI 1.

In operation 109, the specified operation is performed, e. g. to moving, copying, exchanging or deleting the selected arrange region (or several contiguous regions that have been specified together). After completion of the specified operation the routine returns in operation 110 to the invoking program.

Figure 11A:
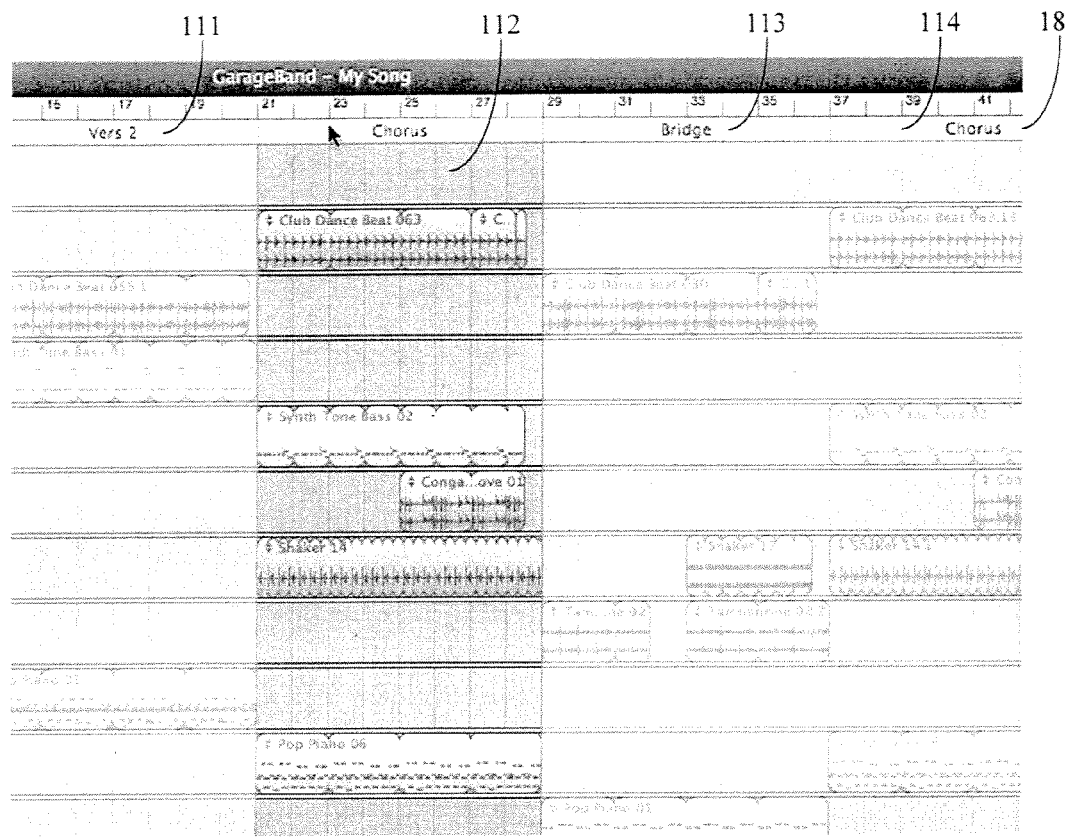
FIGS. 11A to 11C show three different appearances of the GUI while intermediate operations of the process are being displayed.
Figure 11B:
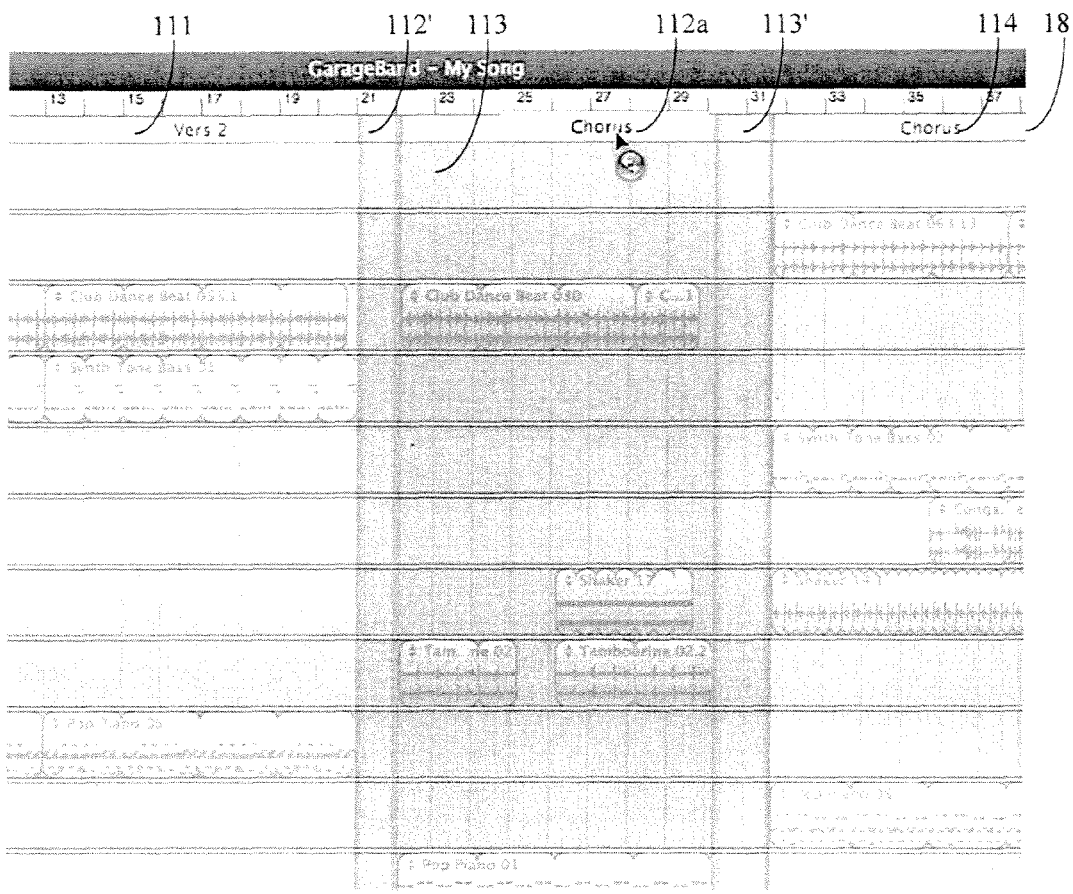
Figure 11C:
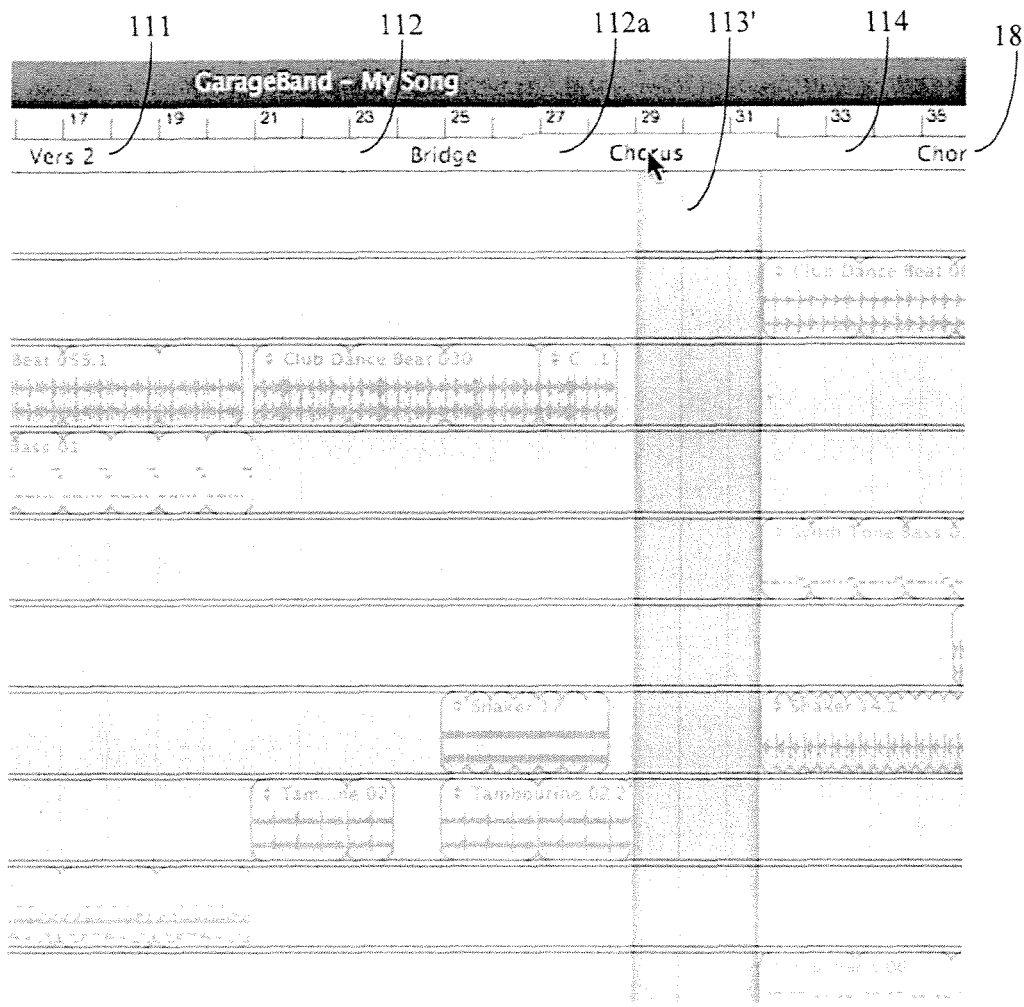

FIGS. 11A to 11C show in an enlarged section of the GUI as an a sequence of operations for moving an arrange region while displaying intermediate configurations using an accordingly manipulated bit map of display was stored when the operation starts.

In FIG. 11A arrange region 112 "Chorus" between neighbouring regions 111 "Verse 2" and arrange region 113 "Bridge" is selected and highlighted. Arrange region 113 is situated to the left of arrange region 114 "Chorus". The head of the cursor in the name field of arrange region 112 on arrange shows the form of an arrow and indicates that the arrange region can be dragging with the cursor.

In FIG. 11B an intermediate situation is shown, where arrange region 112 has been moved over arrange region 113 "Bridge". Arrange region 112 is now only indicated by its standard symbol 112a on the arrange track 18. Arrange region 113 has already moved to the left and filled part of the gap 112' left by arrange region 112. The contents of arrange region 113 are still displayed in its intermediate positions using a stored bit map of its original position (at bar 29).

The head of the cursor in the name field 112a of arrange region 112 has changed to the exchange symbol (double arrow) to indicate that arrange regions 112 and 113 can be exchanged if the former is dropped over arrange region 113. To the left and the right of the displaced arrange region 113 gaps 112' and 113' are shown to indicate the original positions of arrange regions 112 and 113. In another embodiment the gap left by the displaced arrange region 112 may be closed immediately by arrange region 113 after the displacement of arrange region 112 starts; in that case a standard gap 113' is only shown at the presumptive target location.

FIG. 11C shows the situation after the symbolic name field 112a of arrange region 112 on arrange track 18 has been moved beyond the original position of arrange region 113. Only the standard symbol 112a of arrange region 112 in the arrange track 18 is visible and the gap 113'. The cursor head has assumed the form of an arrow to indicate that arrange region 112 will be inserted in gap 113' if dropped at that position. Arrange region 113 has been visible throughout this sequence of operations and has now completely filled the gap left by the moved arrange region 112.

The audio and control data files created by the methods described herein may be stored on a storage device of a data processing system and played back on a system which is coupled to audio transducers, such as speakers.

The present invention can be implemented in numerous ways, e.g. By special electronic circuits, by a program stored on a computer readable or readonly storage medium or by combinations of these. Such a program enables a computer system or other data processing system to execute one or more of the above described features of the invention. The computer system may comprise a processor coupled to a display device and one or more data storage devices such as a hard drive or other magnetic media and/or an optical media (e.g. CD-ROM) or a semiconductor memory such as DRAM or flash memory. The system may also include a mouse and keyboard both connected electrically to the processor. Other variations of the computer system can be envisaged. For example, the use of a joys tick or roller ball or stylus pen and/or a plurality of temporary and hard disc drives and/or connection of the system to the Internet and or other applications of the system in a specific application which may not include a keyboard or mouse, but rather input buttons and menus on the screen.

The data processing system of the DAW may be a general purpose or special purpose computing device, or a desktop computer, a laptop computer, a personal digital assistant, a mobile phone, an entertainment system, a music synthesizer, a multimedia device, an embedded device in a consumer electronic product, or other consumer electronic devices. In a typical embodiment, a data processing system includes one or more processors which are coupled to memory and to one or more buses. The processor(s) may also be coupled to one or more input and/or output devices through the one or more buses. The program storage medium may be a hard disk drive or other magnetic storage media or a CD or other optical storage media or DRAM or flash memory or other semiconductor storage media or other storage devices.

As described above, the preferred embodiment of the present invention uses the basic functionality of a known DAW and adds an additional layer of functionality and structure to implement the invention.

In general, the increased functionality added by at least certain embodiments of the invention to a known DAW comprises one or several of the following aspects:

- Means to select portions of all audio and control files making up a piece of music as selected by an arrange region on a graphical user interface
- Means to manipulate the selected portions as an entity
- Means to modify audio and control files of a piece of music in accordance with the operation specified for the selected entity in the graphical user interface
- Means to display the selected entity in a GUI with tracks of audio information
- Means to display graphical feedback information while arrange regions are being manipulated according to commands entered through the GUI, using a bit map of the arrange field stored when the operation starts and manipulating the bit map in accordance with the operation being performed.

While the invention has been particularly shown and described with reference to preferred embodiments, it will be understood by those skilled in the art that various changes and modifications in form and detail may be made therein without departing from the scope of the claims of the invention.

What is claimed is:

1. A method to process digital audio data comprising:
    displaying the digital audio data in a plurality of tracks horizontally along a time line in a graphical user interface of a computer system, wherein a visual representation of the digital audio data is displayed within the tracks;
    displaying an arrange track horizontally along the time line, wherein the arrange track is configured to define a plurality of arrange regions perpendicular to the tracks within the time line of the digital audio data as user interface objects for user selection and manipulation in the graphical user interface, and wherein the each of the plurality of arrange regions comprise all of the plurality of tracks of the digital audio data within selected time frames of each of the plurality of arrange regions; and
    processing a selected arrange region containing the plurality of tracks as an entity in accordance with commands received through the graphical user interface, wherein the commands received through the graphical user interface correspond to:
        receiving a user selection of the selected arrange region by a first input device; and
        displaying a visual representation of the arrange region while the selected arrange region is being moved by the user under control of the first input device to a user-selected location along the time line.

2. The method of claim 1, wherein the plurality of arrange regions are defined to be contiguous over the entire timeline of the digital audio data.

3. The method of claim 1, wherein the plurality of arrange regions are named entities.

4. The method of claim 1, wherein the selected arrange region is displayed in the graphical user interface with a certain symbol and a certain shape while it is being moved.

5. The method of claim 1, wherein the selected arrange region is inserted between two other contiguous arrange regions when the user input is directed to a boundary between the two other contiguous arrange regions.

6. The method of claim 1, wherein the selected arrange region is removed from between adjacent arrange regions while creating an empty arrange region in between the formerly adjacent arrange regions.

7. The method of claim 1, wherein the selected arrange region is copied and the copy inserted between adjacent arrange regions by receiving a positioning of the user input to the boundary between the existing arrange regions under control of a modifier key.

8. The method of claim 1, wherein the selected arrange region is caused to exchange positions with an adjacent arrange region by receiving a positioning of the user input over the existing arrange region under control of a modifier key.

9. The method of claim 1, wherein the selected arrange region is caused to replace a part of an adjacent arrange region by receiving a positioning of the user input over the part of the existing arrange region to be replaced.

10. The method of claim 1, wherein a pointing device pointer representing the user input is caused to change its shape in accordance with the operation performed on the selected arrange region.

11. The method of claim 1, wherein the graphical user interface displays intermediate states during the operation on the selected arrange region using a bit pattern of the graphical user interface saved when the operation starts.

12. The method of claim 1, wherein the selected arrange region is maintained on the time line while the tracks within the selected arrange region are deleted.

13. The method of claim 1, wherein the selected arrange region is deleted together with the contents of the associated tracks and wherein the space of the deleted arrange region is filled by moving the following arrange regions to the left or merging the subsequent arrange regions to the right.

14. The method of claim 1, wherein the digital audio data comprises automation tracks and wherein automation points are inserted at the intersection of the selected arrange region with at least one automation track.

15. The method of claim 14, wherein one automation point is inserted inside the arrange region and one automation point is created outside the arrange region when a boundary of the arrange region intersects an automation line.

16. The method of claim 1, comprising:
receiving a user input name for at least one of the plurality of arrange regions; and
displaying the user input name for the at least one of the plurality of arrange regions as text within a name field of the at least one of the plurality of arrange regions.

17. A tangible, non-transitory, computer readable medium having computer-executable code stored thereon, the code comprising instructions to generate a graphical user interface comprising:
one or more fields to display a visual representation of digital audio data as a plurality of tracks horizontally in the graphical user interface;
a field to display a time line horizontally along the digital audio data; and
a field to display an arrange track horizontally extending over the time line, wherein the arrange track has a control field to generate a plurality of arrange regions perpendicular to the tracks within the arrange track that can be user selected as user interface objects to manipulate the digital audio data within a time frame of a selected arrange region, wherein the each of the plurality of arrange regions comprise all of the plurality of tracks of the digital audio data within selected time frames of each of the plurality of arrange regions; and wherein manipulating the digital audio data comprises:
receiving a user selection of the selected arrange region by a first input device; and
displaying a display element representing the arrange region while the selected arrange region is being moved by the user under control of the first input device to a user-selected location along the time line.

18. The medium of claim 17, wherein the arrange track is covered by a plurality of contiguous arrange regions.

19. The medium of claim 17, wherein boundaries of the selected time frames of the selected arrange region can be changed by the user input.

20. The medium of claim 17, wherein contiguous arrange regions can be selected simultaneously.

21. The medium of claim 17, wherein the selected arrange region can be moved within the time line of the digital audio data with the user input.

22. The medium of claim 17, wherein the selected arrange region is displayed by a standard symbol and a standard shape while the selected arrange region is being moved under the control of the user input.

23. The medium of claim 17, wherein graphical feedback is provided during the operation on the selected arrange region by using at least parts of a bit map of the graphical user interface stored when the operation starts.

24. The medium of claim 17, wherein automation tracks are displayed with automation points that are created when the arrange region has been moved.

25. The medium of claim 17, wherein each of the plurality of arrange regions is configured to receive the user input via the graphical user interface along a region of the arrange track occupied by each of the plurality of arrange regions within the graphical user interface.

26. A data processing system for processing digital audio data, the system comprising:
a display device to display a visual representation of digital audio data as a plurality of tracks horizontally along a time line on a graphical user interface;
a processor to display an arrange track horizontally along the time line and the tracks, wherein the arrange track is configured to manipulate a plurality of user defined arrange regions defined perpendicular to the tracks as a user interface object for selection and manipulation within the digital audio data stored in a memory of the data processing system in accordance with the instructions received through the graphical user interface, wherein the each of the plurality of user defined arrange regions comprise all of the plurality of tracks of the digital audio data within selected time frames of each of the plurality of arrange regions; and wherein the instructions received through the graphical user interface correspond to:
receiving a user selection of the selected arrange region by a first input device; and
displaying a display element representing the arrange region while the selected arrange region is being moved by the user under control of the first input device to a user-selected location along the time line.

27. The data processing system of claim 26, wherein results of manipulation of the digital audio data by the processor are displayed in the graphical user interface.

28. A tangible, non-transitory, computer readable, storage medium storing executable program instructions, which cause a data processing system to perform a method to process digital audio data, the method comprising:
displaying a visual representation of the digital audio data in a plurality of tracks horizontally along a time line in a graphical user interface of a computer system;
displaying an arrange track horizontally along the time line, wherein the arrange track is configured to define a plurality of arrange regions perpendicular to the tracks within the time line of the digital audio data as user interface objects for user selection and manipulation in the graphical user interface; and
processing a selected arrange region containing a plurality of tracks as an entity in accordance with commands received through the graphical user interface, wherein the each of the plurality of arrange regions comprise all of the plurality of tracks of the visual representation of the digital audio data within selected time frames of each of the plurality of arrange regions, and wherein commands received through the graphical user interface correspond to:
receiving a user selection of the selected arrange region by a first input device; and
displaying a visual representation of the arrange region while the selected arrange region is being moved by the user under control of the first input device to a user-selected location along the time line.

29. The medium of claim 28, wherein the plurality of arrange regions are defined to be contiguous over the entire timeline of the digital audio data.

30. The medium of claim 28, wherein the plurality of arrange regions are named entities.

31. The medium of claim 28, wherein the selected arrange region is displayed in the graphical user interface with a certain symbol and a certain shape while it is being moved.

32. The medium of claim 28, wherein the selected arrange region is inserted between two other contiguous arrange regions by directing the user input to a boundary between the two other contiguous arrange regions.

33. The medium of claim 28, wherein the selected arrange region is removed from between adjacent arrange regions while creating an empty arrange region in between the formerly adjacent arrange regions.

34. The medium of claim 28, wherein the selected arrange region is copied and the copy inserted between adjacent arrange regions by receiving a positioning of the user input to the boundary between the adjacent arrange regions under control of a modifier key.

35. The medium of claim 28, wherein the selected arrange region is caused to exchange positions with another arrange region by receiving a positioning of the user input over the other arrange region under control of a modifier key.

36. The medium of claim 28, wherein the selected arrange region is caused to replace a part of another arrange region by receiving a positioning of the user input over the part of the other arrange region to be replaced.

37. The medium of claim 28, wherein a pointing device pointer representing the user input is caused to change its shape in accordance with the operation performed on the selected arrange region.

38. The medium of claim 28, wherein the graphical user interface displays intermediate states during the operation on an arrange region using a bit pattern of the graphical user interface saved when the operation starts.

39. The medium of claim 28, wherein the selected arrange region is maintained on the time line while the tracks within the selected arrange region are caused to be deleted.

40. The medium of claim 28, wherein the selected arrange region is caused to be deleted together with the contents of the associated tracks and wherein the space of the deleted arrange region is filled by moving the following arrange regions to the left.

41. The medium of claim 28, wherein the digital audio data comprises automation tracks and wherein automation points are inserted at the intersection of the selected arrange region with at least one automation track.

42. The medium of claim 41, wherein one automation point is inserted inside the arrange region and one automation point is created outside the arrange region when a boundary of the arrange region intersects an automation line.

\* \* \* \* \*